Figure 1:
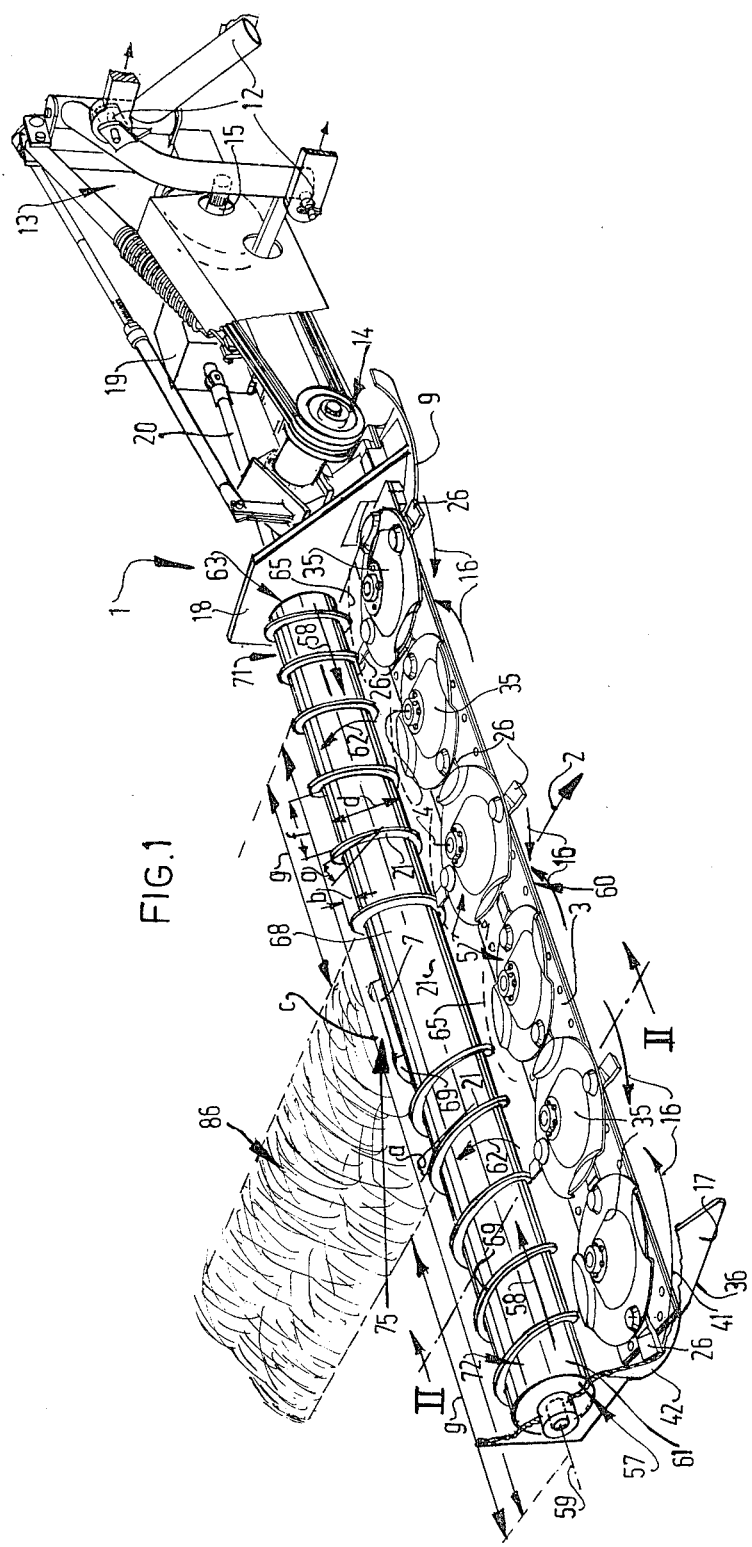

United States Patent [19]
Vissers et al.

[11] 4,330,982
[45] May 25, 1982

[54] MOWING DEVICE

[75] Inventors: Hermanus H. Vissers; Pieter A. Oosterling, both of Nieuw-Vennep, Netherlands

[73] Assignee: Multinorm B.V., Nieuw-Vennep, Netherlands

[21] Appl. No.: 197,189

[22] Filed: Oct. 15, 1980

[30] Foreign Application Priority Data

Oct. 19, 1979 [NL] Netherlands ................. 7907731

[51] Int. Cl.³ .................................... A01D 43/00
[52] U.S. Cl. ............................ 56/192; 56/14.5
[58] Field of Search ............... 56/192, 13.6, 14.5, 56/14.4

[56] References Cited

U.S. PATENT DOCUMENTS

| | | | |
|---|---|---|---|
| 3,412,535 | 11/1968 | Drummond | 56/14.5 |
| 3,474,602 | 10/1969 | Molzahn | 56/14.5 |
| 3,676,988 | 7/1972 | Hauser-Lienhard | 56/192 |

FOREIGN PATENT DOCUMENTS

| | | | |
|---|---|---|---|
| 672019 | 10/1963 | Canada | 56/14.5 |
| 7801931 | 8/1979 | Netherlands | 56/192 |

*Primary Examiner*—J. N. Eskovitz
*Attorney, Agent, or Firm*—Diller, Ramik & Wight

[57] ABSTRACT

A mowing device comprises behind its cutting members a swath former, consisting of a worm rotor conveying the cut crop transversely to the travelling direction of the mowing device, in order to surely convey the cut crop irrespective whether the volume of the cut crop is small or great, the worm rotor rotates in such a sense that its front moves upwardly.

17 Claims, 6 Drawing Figures

MOWING DEVICE

The invention relates to a mowing device, comprising a frame extending transversely of the direction of movement of the mowing device, cutting members supported by said frame and being rotatably mounted on said frame so as to rotate about substantially vertical shafts by means of a driving gear carried by said frame, said cutting members having knives rotating in a horizontal plane and at least one swath former comprising a worm rotor adapted to rotate about a horizontal axis transverse of the direction of movement and being journalled on the frame and conveying the crop laterally towards at least one delivery place and driving means for driving said worm rotor.

A mowing device of this type is known from Dutch patent application No. 7801931. Herein the cut crop is rearwardly transported beneath the worm rotor in a transport channel bounded on the one hand by the worm rotor and on the other hand by a steel trough. For this purpose the worm rotor turns downwards at the front side. The crop is often firmly pinched between the worm rotor and the trough and shifts sideways. The resulting friction may give rise to loss of leaf, damage of stalks and/or loss of juice and at any rate said friction means loss of energy, so that the driving means must have a great strength: the steel trough arranged on the rear side of the worm rotor is heavy and constitutes a very heavy load for the frame and the suspension means for laterally hitching the agricultural implement to an agricultural tractor, particularly due to its hindmost position. Consequently, this mowing device is heavy. The transport channel between the worm rotor and the trough may become clogged in the case of a small passage of the transport channel, when long and/or dense or lying crop has to be cut, whereas in the case of a large passage of the transport channel, when short and/or thin crop has to be worked, the transport operation leaves to be desired.

The invention has for its object to provide an improvement in the swath former. For this purpose the substantially horizontal axis of the worm rotor is located behind the substantially vertical axes of the cutting members and the driving means drive the worm rotor in a sense such, that the worm rotor moves upwards at the front side.

It might be feared, that the crop would not be satisfactorily laterally displaced. However, it appeared that owing to the rearward advance of the cut crop by the cutting members rotating about vertical axes, the stream of the crop is urged against the worm rotor with such a pressure that the crop is sufficiently engaged for the lateral displacement. Since the trough behind and beneath the rotor is omitted, the mowing device according to the invention can be constructed with a comparatively low weight and a relatively low height.

The mowing device according to the invention is preferably characterized moreover in that the side of the worm rotor facing the delivery place converges with the direction of movement of the mower on the top side of the rotor.

The invention is particularly important for a mower whose cutting members are each mainly formed by a preferably disc-shaped cutter carrier having at its periphery at least one knife and being arranged above a housing of the frame accommodating the driving gear. In this case the crop is substantially homogeneously distributed across the width of the mowing area and rearwardly urged against the worm rotor. Above the knife carriers there are not elements hindering the lateral displacement of the crop by the worm rotor.

With the upward direction of rotation at the front side of the rotor light crop might have a strong tendency to move rearwardly over and across the worm rotor before getting at the delivery place. Therefore, the angle of convergence between the side of the worm rotor facing the delivery place and the direction of movement of the mower is preferably small, for example, of the order of magnitude of 10°. In order to obtain nevertheless an adequate lateral transport effect the number of revolutions of the worm rotor is preferably high, of the order of magnitude of 1000 rev/min.

In a satisfactorily operating embodiment of the mowing device according to the invention the worm rotor comprises a cylinder on which a helical strip of low height is arranged.

In order to avoid disturbance of the swath formation in the event of strong winds it is preferred to arrange a wind screen above the worm rotor. This wind screen may be light and simple, when it is formed by a screen frame and a flexible foil. The wind screen may form part of or constitute a safety screen. The shape of the screen is preferably such that on the top side of the worm rotor the screen maintains the crop in contact with the rotor so that the crop is ejected from this worm rotor to a lesser extent by centrifugal and/or ventilation effect. The screen may terminate on its lateral rear sides in swath boards which additionally narrow the swath to be formed and/or provide more sharply defined boundaries of the swath.

The above mentioned and further features of the invention will be explained in the following description of a few embodiments of mowing devices according to the invention with reference to a drawing.

Figure 2:
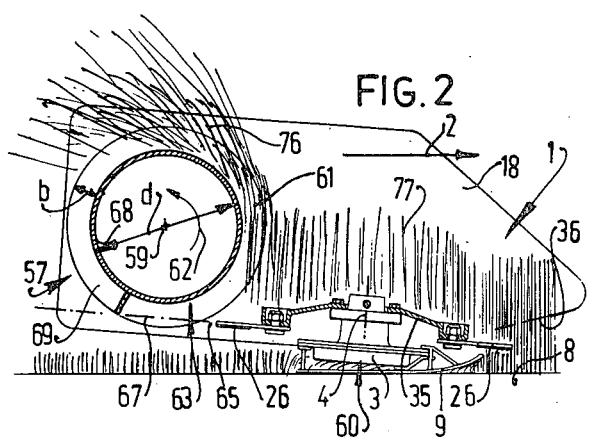
Figure 4:
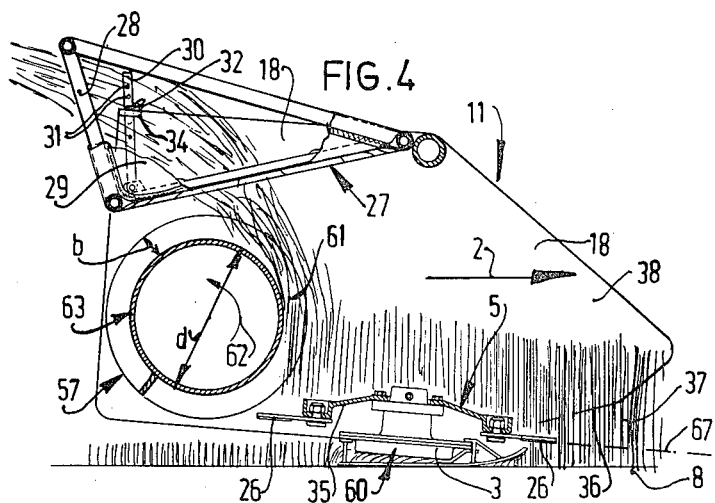
Figure 5:
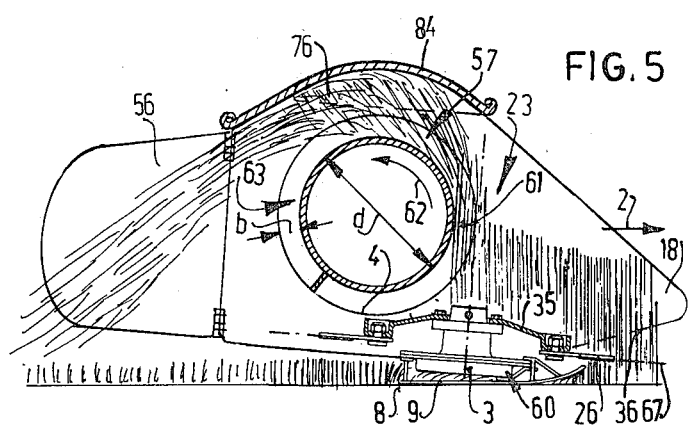
Figure 3:
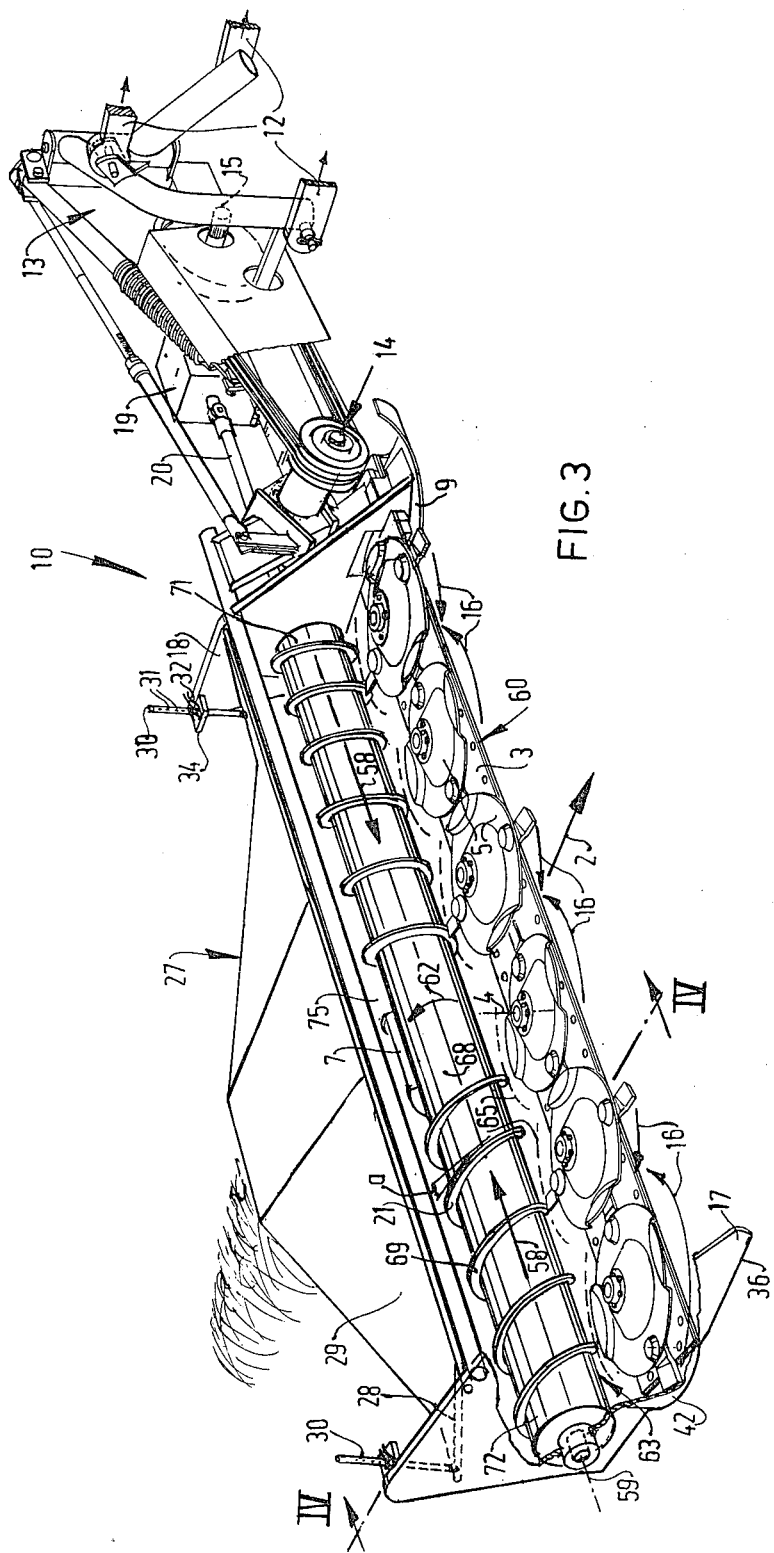
Figure 6:
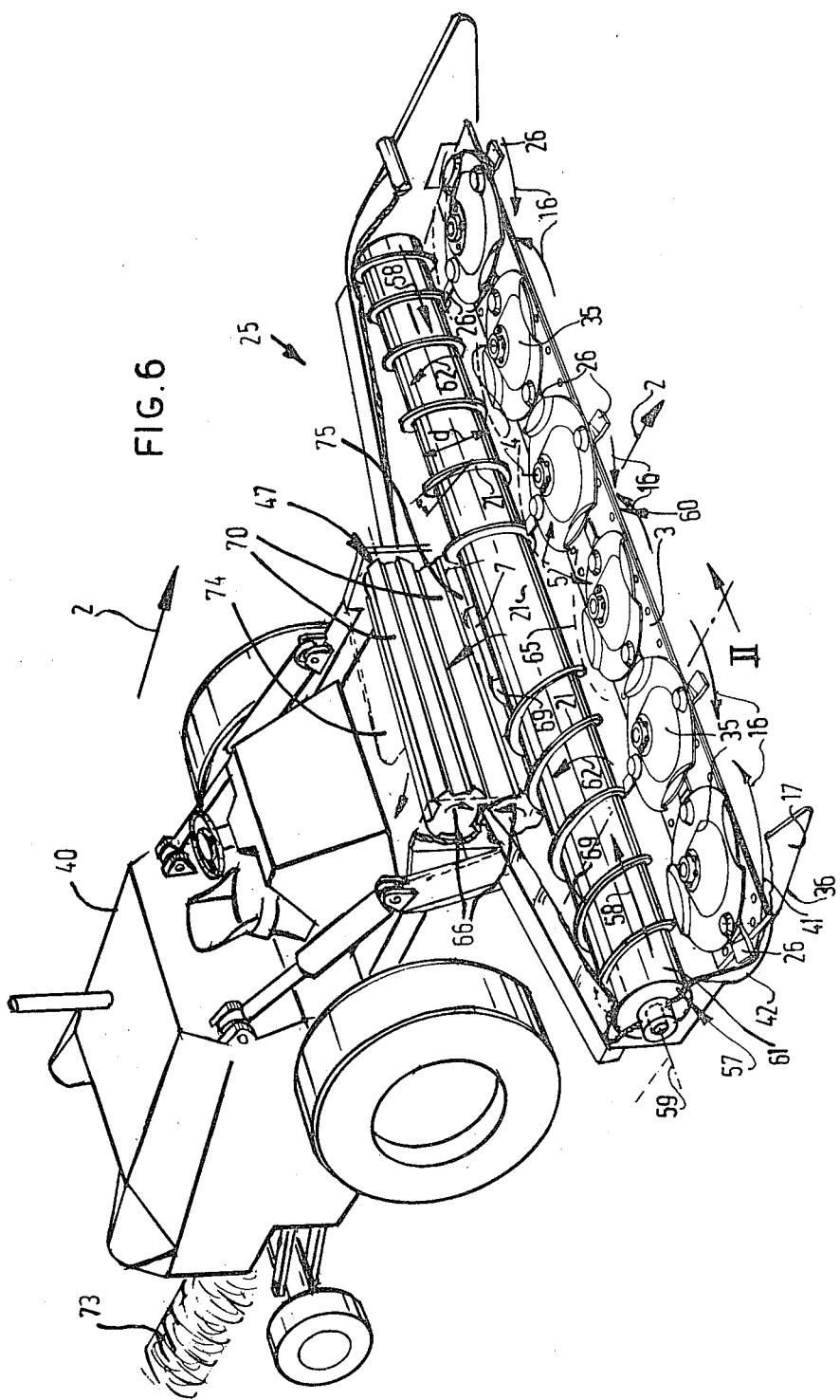

The drawing shows schematically in:

FIG. 1 a perspective view of a preferred embodiment of a mowing device in accordance with the invention, FIG. 2 an enlarged sectional view taken on the line II—II in FIG. 1, FIGS. 3 and 6 each a perspective view like FIG. 1 of different mowing devices in accordance with the invention, FIG. 4 a sectional view taken on the line IV—IV in FIG. 3 and FIG. 5 a sectional view corresponding to FIG. 2 of a further mowing device in accordance with the invention.

Each of the mowing devices shown in the figures comprises a frame 60 extending tranversely of the direction of movement 2 and is mainly formed by an elongated beam 3 and side screens 17 and 18 fastened to the ends of said beam.

The mowers 1, 10, 11, 23 and 25 of FIGS. 1 to 6 respectively comprise each a plurality of cutting members 5 rotatable about substantially vertical shafts 4 and arranged above the beam 3, a known driving gear (not shown) arranged inside the beam 3 and driving the cutting members 5 and consisting of a series of pinions, at least one supporting member 9 for holding the mower on the field 8 and a swath former 57. The frame 60 of the mowers 1, 10, 11 and 23 can be hitched by means of a conventional auxiliary frame 13 with a threepoint suspension gear 12 to the side of a tractor (not shown), whilst the aforesaid driving gear (not shown) is actuated via a driving system 14 by a shaft 15 to be linked to the power take-off shaft of the tractor.

The mower 25 is fastened to a vehicle 40 straight in front thereof.

The cutting members 5 rotate pairwise with high speed in opposite senses indicated by arrows 16.

The present invention is particularly important for a mower 1, 10, 11, 23 and 25 as shown in FIGS. 1-6 respectively, in which each cutting member 5 mainly comprises a knife carrier formed by a disc 35 having two protruding knives 26 and being journalled directly above a flat beam 3. The knives 26 of neighbouring cutting members 5 are relatively off-set in the directions of the arrows 16.

Each one of the mowers illustrated in the drawing comprises a swath former 57. This former comprises a worm rotor 63 taking over the cut crop from the cutting members 5 and displacing the same in the transverse direction 58 towards a delivery place 75, said rotor being rotatable about a substantially horizontal axis 59 and being journalled in the side screens 17 and 18 of the frame 60 of the mower. The front side 61 of the worm rotor 63 is driven upwards in the direction indicated by the arrow 62 by means of driving means consisting, for example, as shown in FIGS. 1 and 2 of a driving gear 19 and a universal shaft 20. These driving means drive the worm rotor 63 with a high speed of, for example, 1000 rev/min, whereas the cutting members 5 are driven with an even higher speed of, for example, 3000 rev/min. FIGS. 1-4 show the worm rotor 63 near and behind the hindmost arcs 65 of the circles of the knives 26, whilst the bottomside of the rotor 63 is located at an even lower level than the plane of movement 67 of the knives 26.

The worm rotor 63 comprises a central cylinder 68 around which is wound and welded a helical strip 69. The strip 69 extends from each of the two ends 71 and 72 of the mower 1 approximately up to a central delivery place 75. The strip 69 is wound at one end 71 and at the other end 72 of the mower 1 in opposite direction around the cylinder 68 in a manner such that the side 21 of the worm rotor 63 facing the delivery place 75 on the top side thereof converges with the direction of movement 2 of the mower 1. The angle of convergence a thus formed is small, for example, of the order of magnitude of 10° and may be 11°, 13° or 7°. For the worm rotor 63 a high number of revolutions and a small pitch of the helix is chosen. The worm rotor 63 is not covered on the front side and on the rear and bottom sides. In the area of the delivery place 75 the cylinder 68 of the worm rotor 63 is provided with at least one catch 7, for example, a strip joining the strip 69, said catch 7 throwing the crop over and across the worm rotor 63 to the rear on the field (FIG. 1) or into a crushing device 47 (FIG. 6).

During the mowing operation of this mower 1 the cut crop is guided over and across the rapidly rotating cutting members 5 to the rear and owing to the forward speed of the mower 1 and to the rearward pushing force of the cutting members the crop is moved into engagement with the worm rotor 63, which conveys it in the transverse direction 58. The cut crop 76 already gripped by the worm rotor 63 and moving in the transverse direction 50 carries along with it the cut crop 77 still located in front thereof and above the cutting members 5, since all cut crop is entangled and/or pressed together. The cut crop 76 readily slides rearwardly and in the transverse direction 58, because the sliding resistance of the cut crop 77 on the common transport surface of rapidly rotating cutting members 5 is particularly low. Therefore, the strip 69 need only have a small height b. This height may be less than 10 cm and the strip 69 preferably projects by about 6 cm above the cylinder 68. The cylinder 68 preferably has a large diameter e of, preferably, more than 20 cm.

A satisfactory operation of the mower 1 shown in FIGS. 1 and 2 was obtained with a width of the mowing area c of 240 cm, a cylinder diameter e of 24 cm, a height b of the strip 69 of 6 cm, a pitch f of 20 cm, a speed of the worm rotor 63 of 1000 rev/min, a speed of the cutting members 5 of 3000 rev/min, and a travelling speed of the mower 1 in the direction of the arrow 2 of 10 to 15 km/hour. A great advantage of the mower according to the invention is, that it allows mowing with a high travelling speed so that the mowing capacity is very high, whilst a satisfactorily workable swath 86 is left behind the mower 1, whereas on strips having a width g, no or substantially no stalks are deposited so that satisfactorily visible wheel tracks are left free for hay-making implements.

The mowers 10 and 11 of FIGS. 3 and 4 are similar to the mower 1 of FIGS. 1 and 2, the difference being that above the worm rotor 63 a wind screen 27 serving in addition as a safety screen is arranged. This wind screen 27 mainly comprises a screen frame 28 of steel tubes and a flexible foil 29 fastened to said tubes. At the delivery place 75 the wind screen 27 is held at a higher level above the worm rotor 63 than at the ends of the worm rotor 63 in order to prevent clogging of the delivery place 75. The level of the wind screen 27 is adjustable with the aid of setting rods 30, each of which is supported by a console 34 of a side screen 17, 18 with the aid of a split pin 32 inserted into a selected hole 31.

The mowers 1, 10 and 11 of FIGS. 1 to 4 each have a side screen 17 whose lower edge 36 of a front portion 38 extending as far as into the crop to be cut 37 is inclined downwards to the rear as far as slightly below the plane 67 of the knives 26. The lower edge 36 has an outwardly bent portion 42 curved around the circular path of movement 41 of the knives 26. Owing to this shape of the side screen 17 a clear separation is obtained between the crop not yet cut and the mowing area.

FIG. 5 shows a mower 23 different from that of FIGS. 1 and 2 in that the worm rotor 63 is arranged above the cutting members 5. The machine is consequently more compact and can therefore be constructed with a lower weight. Above the worm rotor 63 a curved metal screen 84 is arranged, which is fastened to side screens 18 and which guides the cut crop 76 and holds the same in contact with the worm rotor 63. This screen 84 prevents the crop 76 from being ejected away from the worm rotor 63 by centrifugal force and ventilation effect. On the rear side of this mower rearwardly extending swath boards 56 are arranged for limiting the delivery place 75.

The crusher device 47 of the mower 25 of FIG. 6, arranged behind the delivery place 75 of the worm rotor 63, comprises two interengaging rollers 70 rotating in opposite senses and bending the crop stalks and depositing the crop, for example, grass in a swath 73 on the field. The swath 73 may, if desired, be additionally narrowed by means of a rearwardly inclined and inwardly directed swath board 74.

What we claim is:

1. A mowing device comprising a frame extending transversely of the direction of movement of the mowing device, cutting members supported by said frame and being rotatably mounted on said frame so as to rotate about substantially vertical shafts by means of a driving gear carried by said frame, said cutting members having knives rotating in a horizontal plane and at least one swath former comprising a worm rotor adapted to rotate about a horizontal axis transverse of the direction of movement and being journalled on the frame and conveying the crop laterally towards at least one delivery place and driving means for driving said worm rotor, characterized in that the substantially horizontal axis of the worm rotor is located behind the substantially vertical axes of the cutting members and in that the driving means drive the worm rotor in a sense such, that the worm rotor moves upwards at the front side.

2. A mowing device as claimed in claim 1, characterized in that the side of the worm rotor facing the delivery place on the top side of the worm rotor converges with the direction of movement of the mowing device.

3. A mowing device as claimed in claim 1 or 2, characterized in that the cutting members mainly comprise each a knife carrier having at least one knife at the periphery and being disposed above a housing of the frame accommodating the driving gear.

4. A mowing device as claimed in claim 2 or 3, characterized in that the angle of convergence between the side of the worm rotor facing the delivery place and the direction of movement of the mower is small, preferably of the order of magnitude of 10°.

5. A mowing device as claimed in any one of claims 1 or 2, characterized in that the number of revolutions of the worm rotor is high, preferably of the order of magnitude of 1000 rev/min.

6. A mowing device as claimed in any one of claims 1 or 2, characterized in that the worm rotor comprises a cylinder and a helical strip of low height arranged on said cylinder.

7. A mowing device as claimed in claim 6, characterized in that the strip projects above the cylinder by less than 10 cm, preferably by 6 cm.

8. A mowing device as claimed in claim 7, characterized in that the cylinder has a diameter of more than 20 cm, preferably 26 cm.

9. A mowing device as claimed in any one of claims 1 or 2, characterized in that a screen is arranged above the worm rotor.

10. A mowing device as claimed in any one of claims 1 or 2, characterized in that the lower side of the worm conveyor is located approximately at the level of the top sides of disc-shaped cutting members.

11. A mowing device as claimed in any one of claims 1 or 2, characterized in that the lower side of the worm conveyor is located approximately at the level of the substantially horizontal plane of the knives of the cutting members.

12. A mowing device as claimed in claim 6, characterized in that the lower side of the cylinder of the worm conveyor is located approximately in the substantially horizontal plane of movement of the knives of the cutting members.

13. A mowing device as claimed in any one of claims 1 or 2, characterized in that the front side of the worm rotor is located in the plane going through the standing axes of the cutting members or behind the same.

14. A mowing device as claimed in claim 6, characterized in that the front side of the cylinder of the worm rotor is located above the hindmost parts of the circular path of the knives.

15. A mowing device as claimed in any one of claims 1 or 2, characterized in that at the delivery place a crop-treating tool, for example, a crop conditioner is arranged.

16. A mower/windrower comprising, in combination:
  a frame adapted to be traveled over a field;
  a generally horizontal drum rotatably carried by said frame about a generally horizontal axis lying transversely to the direction of travel of said frame, and a series of rotary cutting devices disposed in leading relation to said drum, each cutting device being rotatable about an upstanding axis and including at least one cutting knife element terminating in predetermined radial spacing from such axis whereby each cutting device covers a swath having a width twice that of such radial spacing as the frame is traveled, and said axes being disposed in serially spaced relation with respect to the lengthwise extent of said drum and having said axes spaced with respect to each other such that adjacent swaths overlap so as to encompass a cumulative cutting swath whose width is generally the same as the length of the drum;
  means for rotating said drum at high speed such that that portion of the drum nearest the cutting devices sweeps upwardly relative to the ground surface, and said drum having a shallow angle helix blade thereon terminating in an axially extending blade portion whereby cut crop may be transported axially by the drum, laterally with respect to the direction of travel, until it reaches the axially extending blade portion whereat such crop is flung rearwardly as a windrow; and
  means for rotating said cutting devices at a high enough speed as to urge a stream of cut crop rearwardly against said drum with such pressure that the crop is sufficiently engaged for lateral displacement thereby.

17. The mower/windrower as defined in claim 16 wherein said drum is driven at a speed such that its peripheral velocity corresponds generally to that obtained by a drum diameter of 24 cm operating at a rotational speed of 1000 RPM, said cutting devices are driven at speeds of about 3000 RPM, and said shallow angle is in the order of 10°.

* * * * *